March 5, 1935.  R. DREVERHOFF  1,993,363
CRANK SHAFT LATHE
Filed May 2, 1934
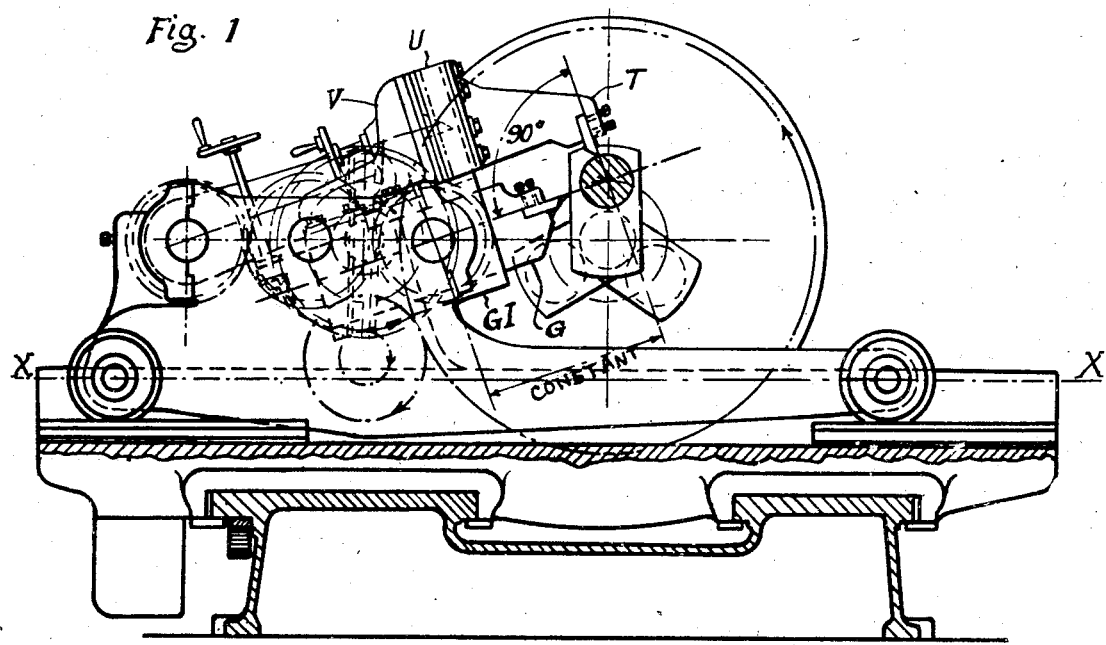
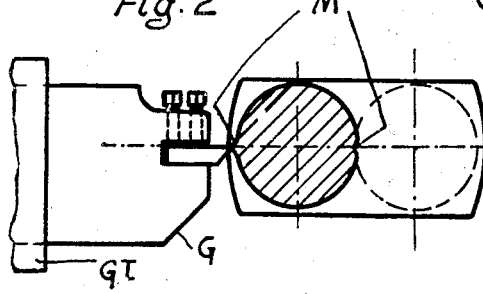
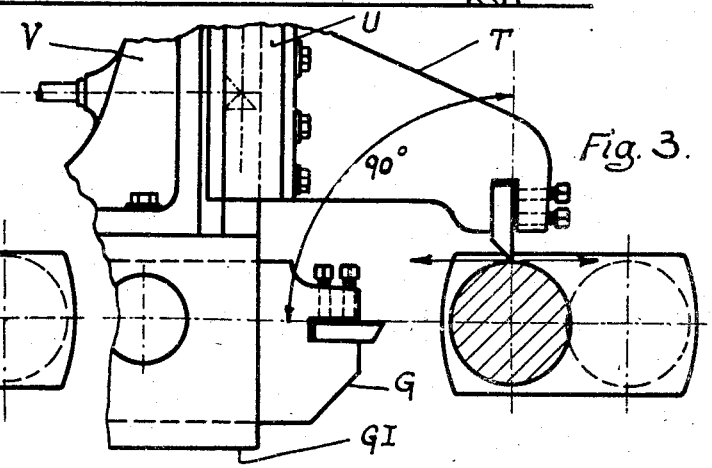
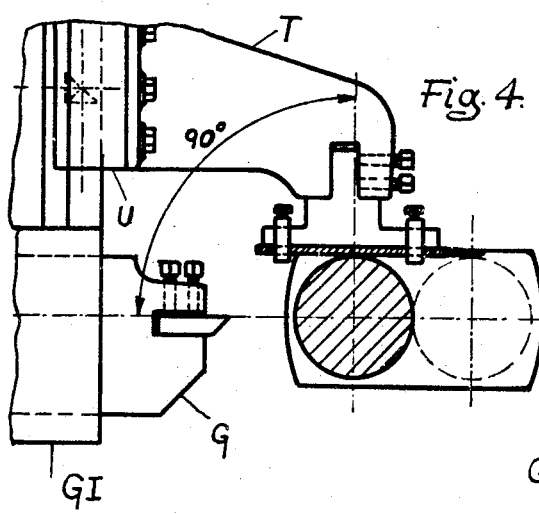
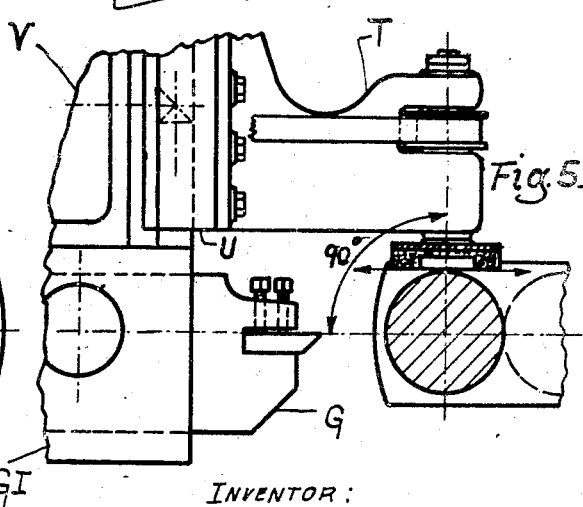
INVENTOR:
Rudolf Dreverhoff.

Patented Mar. 5, 1935

1,993,363

UNITED STATES PATENT OFFICE 1,993,363

CRANK SHAFT-LATHE

Rudolf Dreverhoff, Brooklyn, N. Y.

Application May 2, 1934, Serial No. 723,435

1 Claim. (Cl. 82—9)

The present invention relates to improvements in the class of crankshaft lathes in which the cutter moves in accordance with the movement of crank pins and like a connecting rod or parallel to itself.

The object of my invention is the provision of a toolholder, which holds the cutter in such a position, that the acting point is placed in that tangent to the pin to be machined which is parallel to the direction of movement of the cutter support at the moment of the reversal of its movement, whereby is avoided the mark on the pin, caused by the reversal of the forces at said moment.

The invention is further explained in the course of the following description, in the appended claims and by the accompanying drawing in which:

Fig. 1 is a side elevation of one of the above said kinds of crank pin lathes where the cutter moves synchronized to the pin in the way of a connecting rod.

On this apparatus is shown the present invention in form of a second toolholder, which holds and guides the cutter in accordance with my invention.

Fig. 2 is an enlarged side view of the toolholder according to the old method, which causes the mark on the pin. The marks "M" there are shown in exaggerated form.

Fig. 3 is the same side view of the toolholder of the old method, but drawn back into non-cutting position, and there is shown a second toolholder, which holds and guides the cutter in accordance with my invention. The position of the toolholder shown in the Figures 2, 3, 4 and 5 is at the moment of the reversal of the movement of the support.

Figs. 4 and 5 show the same arrangement as Fig. 3 but with more suitable kind of cutters set in the toolholder. In Fig. 4 is applied a cutter like a flat file, and in Fig. 5 a grinding wheel. The motor for the grinding wheel can be placed back on the swinging tool support or also directly on the wheel spindle.

The present invention serves to avoid the mark on the pin, produced by the reaction of the forces at the moment of reversal of the movement of the cutter support, and provides such a position of the cutter that its cutting point is placed in that tangent to the pin which is parallel to the direction of movement of the support at the moment of the reversal of its movement, and the said direction of movement is always simultaneously on that line in which the reversal of the forces takes place.

The effect of the position of the cutting point in the moment of said reversal of movement, is the same as that of the ball grinding system, where the ball moves between two grinding discs which are rotating parallel to each other.

That means, that the movement or fluctuation of the grinding faces in direction parallel to each other, have no influence on the precision of the ball to be ground.

The cutting point of the grinding wheels is here in lines tangent to the ball, which is parallel to the rotating grinding faces or their movement or fluctuations parallel to each other.

The present invention produces the same effect and the same position of the cutting point of the cutter during the moment of reversal of the movement of the support in the above said kind of crank pin lathes.

The direction of movement of the support, in which are reversed the forces, produced by the weight, friction etc. of that support, depends on the situation of the machine.

That line is in the present drawing the horizontal line X—X. Regarding the position of the acting point of the cutter it would be always at an angle of 90 degrees to the said direction of movement of the support at the moment of its reversal.

Referring to the drawing, it is to be noted, that the construction of the toolholder for holding the cutter in a position in accordance with my invention may be of any kind and is no part of the present improvement.

The drawing shows an application of my invention in a crank pin lathe, where the cutter moves synchronized with the pin in accordance with the movement of a crank pin and connecting rod.

A toolholder "T" is mounted on a slide "U" for feeding the tool toward the pin. The slide "U" slides on an angle-bracket "V", adjustably mounted on the swinging support "GI" so that the toolholder "T" moves in accordance with the movement of the swinging support "GI" and simultaneously said toolholder "T" holds the acting point of the cutter in a position to the pin in accordance with the idea.

The swinging tool support "GI" is mounted on a pair of master cranks of the same throw as the crank to be turned and these cranks and the means for supporting and driving the crank to be turned are geared together to rotate in unison.

The toolholder "T" may be connected directly with the main toolholder "G" instead of the swinging tool support "GI", and also the toolholder "T" may be located in opposite direction and that would be in the present case of the Figure 1 below the swing "GI" so that the acting point touches the pin below under the same conditions as when it is above.

What I claim is:

In a lathe for turning crank pins a swinging tool support, a pair of master cranks for supporting said tool support, means for supporting and rotating the shaft to be turned, connections between the master cranks and the work supporting and driving means for rotating them in unison so that the swinging tool support moves parallel to itself or like a connecting rod and a toolholder mounted on the tool support arranged to present the tool in a direction at right angles to the movement of the tool support so that the cutting edge lies on a tangent to the crank pins parallel to the line of movement of the tool support.

RUDOLF DREVERHOFF.